United States Patent
Schwarz et al.

(10) Patent No.: US 11,260,471 B2
(45) Date of Patent: Mar. 1, 2022

(54) METHOD AND DEVICE FOR MONITORING A JOINING SEAM DURING JOINING BY MEANS OF A LASER BEAM

(71) Applicant: PRECITEC GMBH & CO. KG, Gaggenau-Bad Rotenfels (DE)

(72) Inventors: Joachim Schwarz, Kleinandelfingen (CH); Stefan Birmanns, Buch am Irchel (CH)

(73) Assignee: PRECITEC GMBH & CO. KG, Gaggenau-Bad Rotenfels (DE)

(*) Notice: Subject to any disclaimer, the term of this patent is extended or adjusted under 35 U.S.C. 154(b) by 846 days.

(21) Appl. No.: 16/076,309

(22) PCT Filed: Feb. 10, 2017

(86) PCT No.: PCT/EP2017/052985
§ 371 (c)(1),
(2) Date: Aug. 7, 2018

(87) PCT Pub. No.: WO2017/137550
PCT Pub. Date: Aug. 17, 2017

(65) Prior Publication Data
US 2021/0187657 A1    Jun. 24, 2021

(30) Foreign Application Priority Data
Feb. 12, 2016 (DE) ............ 10 2016 102 492.9

(51) Int. Cl.
*B23K 26/03* (2006.01)
*B23K 26/24* (2014.01)
(Continued)

(52) U.S. Cl.
CPC .......... *B23K 26/032* (2013.01); *B23K 26/046* (2013.01); *B23K 26/06* (2013.01);
(Continued)

(58) Field of Classification Search
CPC ...... B23K 26/08; B23K 26/046; B23K 26/06; B23K 31/003; B23K 26/702; B23K 26/24;
(Continued)

(56) References Cited

U.S. PATENT DOCUMENTS

2003/0217993 A1* 11/2003 Stol .................. B23K 26/26
219/121.64
2004/0134891 A1* 7/2004 Schumacher .......... B23K 26/04
219/121.63
(Continued)

FOREIGN PATENT DOCUMENTS

DE   10 2006 004 919 A1   8/2007
DE   10 2007 030 395 A1   1/2009
(Continued)

OTHER PUBLICATIONS

Machine translation of Japan Patent No. 04-127,984-A, Jul. 2021.*
(Continued)

*Primary Examiner* — Geoffrey S Evans
(74) *Attorney, Agent, or Firm* — Fenwick & West LLP

(57) ABSTRACT

A method for monitoring a joining seam, in particular during joining by a laser beam, wherein in the processing direction before a processing point a joining site is measured in order to detect the position and geometry thereof, at least one position of a joining seam is determined from the position of the joining point, and in the processing direction after the processing point the joining seam is measured in order to detect the geometry thereof at the determined position. A device is also provided for carrying out said method and to a laser processing head equipped with such a device.

11 Claims, 8 Drawing Sheets

Figure 1:
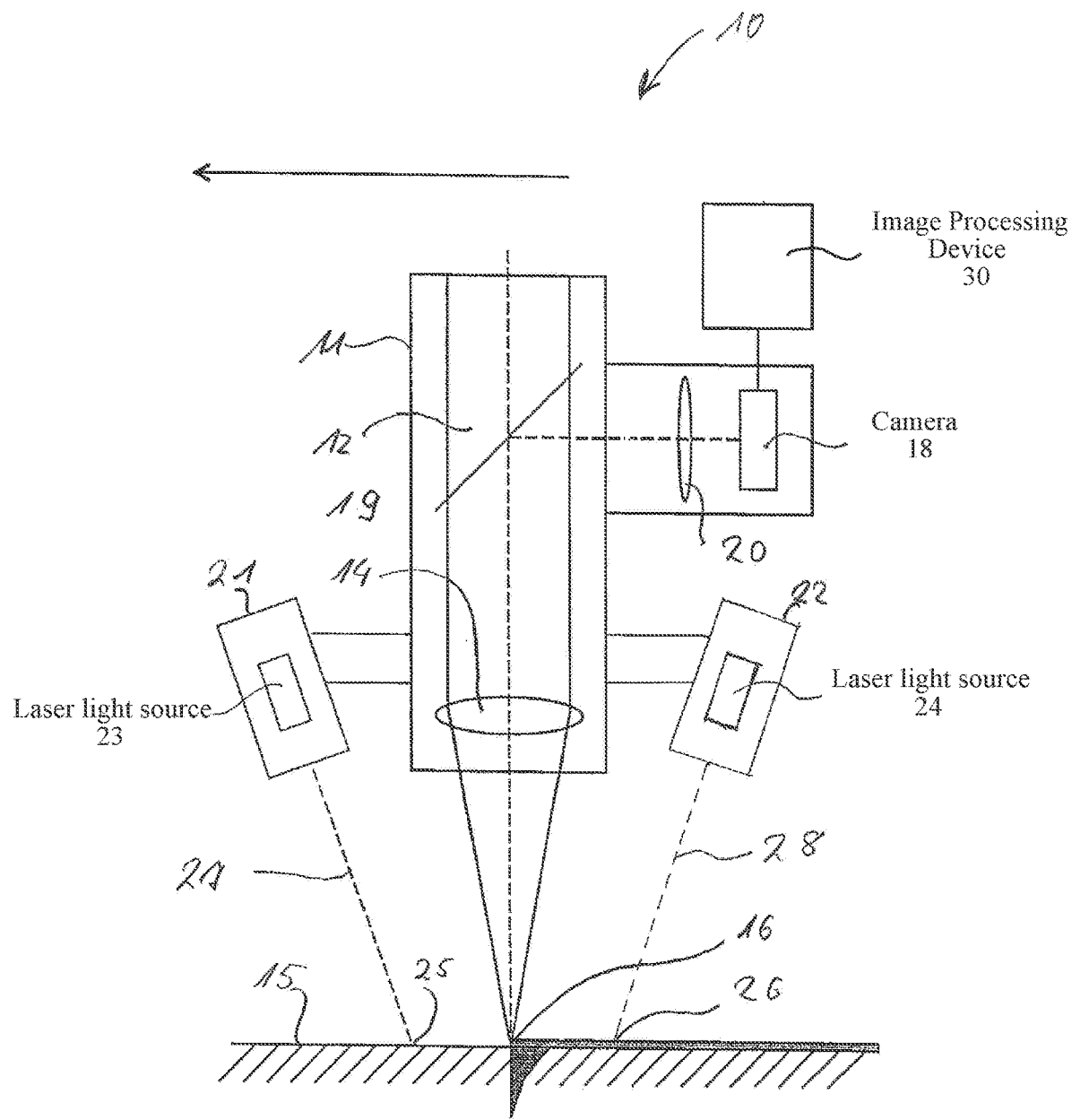

(51) Int. Cl.
　　*B23K 26/70* (2014.01)
　　*B23K 26/046* (2014.01)
　　*B23K 26/06* (2014.01)
　　*B23K 26/08* (2014.01)
　　*B23K 31/00* (2006.01)

(52) U.S. Cl.
　　CPC .............. *B23K 26/08* (2013.01); *B23K 26/24* (2013.01); *B23K 26/702* (2015.10); *B23K 31/003* (2013.01)

(58) Field of Classification Search
　　CPC .... B23K 26/26; B23K 26/032; B23K 26/044; B23K 26/04; B23K 9/1274; G05B 2219/45138
　　See application file for complete search history.

(56) References Cited

U.S. PATENT DOCUMENTS

| | | | | |
|---|---|---|---|---|
| 2012/0234805 | A1* | 9/2012 | Schwarz | B23K 26/044 219/121.63 |
| 2013/0062324 | A1 | 3/2013 | Dorsch et al. | |
| 2015/0001196 | A1* | 1/2015 | Kim | B23K 26/26 219/121.83 |
| 2015/0273604 | A1* | 10/2015 | Anderson | B23K 31/02 228/102 |

FOREIGN PATENT DOCUMENTS

| | | | |
|---|---|---|---|
| DE | 10 2009 042 986 B3 | 3/2011 | |
| DE | 10 2010 011 253 A1 | 9/2011 | |
| DE | 10 2011 012 729 A1 | 9/2012 | |
| DE | 10 2011 078 276 B3 | 12/2012 | |
| DE | 10 2011 104 550 A1 | 12/2012 | |
| EP | 2 062 674 A1 | 5/2009 | |
| EP | 2 567 773 A1 | 3/2013 | |
| JP | 02104484 A * | 4/1990 | ............. B23K 26/04 |
| JP | 04127984 A * | 4/1992 | |
| JP | 05337668 A * | 12/1993 | |
| JP | 2005-334957 A | 12/2005 | |
| WO | WO 03/041902 A1 | 5/2003 | |
| WO | WO 2005/095043 A1 | 10/2005 | |
| WO | WO 2007/053973 A1 | 5/2007 | |
| WO | WO 2008/028580 A1 | 3/2008 | |

OTHER PUBLICATIONS

PCT International Search Report, PCT/EP2017/052985, dated May 10, 2017, 4 Pages.

Japan Patent Office, Notice of Reasons for Refusal, JP Patent Application No. 2018-542764, dated Nov. 12, 2019, ten pages.

* cited by examiner (a)

(b)

(c)

(a) (b)

METHOD AND DEVICE FOR MONITORING A JOINING SEAM DURING JOINING BY MEANS OF A LASER BEAM

The invention relates to a method and a device for monitoring a joining seam, in particular when joining by means of laser radiation for quality assurance.

100% inspection and measurement of the joining seam arising during the joining, i.e., the weld bead, especially in the case of fully automatic production, is required in joining processes, in particular laser welding or soldering.

The inspection of the weld seam is usually performed "offline" in downstream inspection cells with sensor systems which serve exclusively for the purpose of inspecting the joining seam, in particular the weld or solder seam.

Weld and solder seams can be monitored fully automatically with the seam inspection system SOUVIS® 5000 from Precitec GmbH & Co. KG. For this purpose, two light lines parallel to one another are projected obliquely onto this as triangulation lines transversely to the seam and are observed by a camera essentially perpendicular to the seam. In addition, a high-resolution gray image of the seam is simultaneously recorded. Seam edges are determined via geometrical changes along the triangulation lines, via brightness changes of the triangulation lines and via brightness differences in the gray image. Furthermore, the gray image is also evaluated. Thus, the smallest defects such as pores and molten bath ejection can be detected.

A further optical offline test method is known from DE 2011 012 729 A1, in which a laser triangulation line is evaluated for error detection and quality monitoring taking into account its intensity profile.

However, with the welding process downstream systems, only the weld or solder seam can be inspected, the exact location of the seam to the joint, i.e., to the point to be joined before joining and information about the joint and the welding process, is missing. The measurement of the joint and the weld or solder seam on all geometric features, the investigation of defects on the surface (e.g., open pores, holes) and the investigation of internal defects (e.g., poor connection, lack of weld penetration) should, however, take place, if possible, during the joining process, i.e., during welding or soldering.

A method and a device for evaluating joints and workpieces are known from WO 03/041902 A1. Here, in front of and behind the joining or welding process, in each case a laser light line is projected transversely to a joint line or joining seam onto the workpiece and observed by a camera. A gray image is taken at the same time. In the leader, the course of the joint line is determined from the laser light line and the gray image. To inspect the weld seam, the gray image and the image of the laser light line are evaluated in the trailer.

A method and a device for optically assessing welding quality during welding is known from WO 2008/028580 A1. Here, images taken by means of a camera of the process and a downstream triangulation line, i.e., a light line extending transversely to the weld seam, are used to assess the quality of the weld seam.

A further method and a further device for evaluating joints are known from WO 2007/053973 A1. Here, to evaluate the location and quality of the joining seam, a combined image of the joining seam with a light pattern and a gray image are recorded in the same sensor but in two different regions. Triangulation line and gray image evaluation can therefore be performed quickly with a sensor to determine the location from the triangulation line (light pattern) and the quality of the weld or joining seam from the gray image.

An optical measuring device for monitoring a joining seam, a joining head and laser welding head with the same is known from DE 10 2011 104 550 B4. Here, a triangulation light line is generated behind a joining region on the workpiece, which crosses the joining seam and which is detected by a camera. A second camera takes a picture of the joining seam itself. The optical measuring device makes it possible to simultaneously perform a rapid 3D measurement of the joining seam and to detect small local defects.

DE 10 2010 011 253 B4 describes a laser processing head with a light-section device, which projects a light line onto a joint line in front of a joint region, and with a camera which observes the light line and the joint region, i.e., a molten bath generated by the laser radiation. Here, the location of the joint line determined in the light-section method is stored as a target trajectory and compared with the location of the associated molten bath center point in order to control the laser processing process.

WO2005/095043 A1 describes a laser joining head and laser joining method, in which the measurement of the joint for seam tracking and the measurement of the weld bead for quality monitoring is performed by means of two sensors in a joining head in the leader and in the trailer.

A method for detecting errors during a laser processing process and a laser processing device is known from DE 10 2011 078 276 B3, in which emitted and/or reflected radiation at specific wavelengths for spatially resolved evaluation is detected on the workpiece side to enable joint tracking or seam tracking and error detection.

A method for preparing and performing a laser welding process is also known from EP 2 062 674 A1, in which the joint line in the leader and the joining seam in the trailer are observed by means of a light-section method, while the processing region itself is detected on the basis of the radiation emitted or reflected thereby. The laser welding process is controlled on the basis of the determined locations of the joint line, the processing region and the joining seam.

A method for checking the seam quality during a laser welding process is known from EP 2 567 773 A1, in which two laser light lines in front of or behind the focal spot are monitored by a CMOS camera and the processing region and the molten bath by an InGaAs camera.

The location of the joint can therefore be determined, for example, by means of the light-section in front of the laser focal spot, while the location and shape of the seam formed, in particular the curvature or the geometry of the seam upper bead can be detected behind the laser focal spot by means of the light-section. A combined evaluation of the measurement results serves to simultaneously use several seam characteristics for quality assurance.

DE 10 2006 004 919 A1 relates to a laser welding head having a first line projector which projects a laser line at an angle to the observation axis of image processing means laterally of the weld seam in a measuring position in the leader. This light-section line is used for seam tracking. To control the weld seam produced, another line projector is provided which projects a laser line on the weld seam laterally to the welding direction at a second measuring position.

It is known from DE 10 2009 042 986 B3, both in the leader and in the trailer, to lay a light line transversely to the seam profile over a location to be joined or over a joined location, i.e., over a joining seam, in order to detect the geometry of the location to be joined and the geometry of the joined location. The geometry of the location to be joined and the geometry of the joined location can then be compared with each other, so that the geometry of the joining seam, thus the weld seam, can be determined regardless of the geometry of the location to be joined.

From DE 10 2007 030 395 A1, a method and a device for laser welding of a work piece is known, wherein in welding direction in front of a welding point on the work piece, at least one marker spaced apart from a gap to be joint in the work piece is detected. This marker is also detected in welding direction behind the welding point, for determining an optimal welding position of the laser beam transverse to the welding direction based on the position of the marker transverse to the welding direction, which is detected in front of and behind the welding point.

Laser processing or welding heads with camera technology and optics permit the joining position to be detected during welding with a lighting device leading the welding process. The weld seem can be geometrically measured on the basis of the resulting weld bead and examined for defects with a lighting device downstream of the welding process. However, the exact position of the weld bead, i.e., in particular its center position, and its edge points are crucial for the inspection and measurement of weld bead.

If the edge points of the seam are determined incorrectly, the subsequent seam width calculation will also be incorrect. The seam over or under curvature, which is calculated from the connecting straight line of the end points to the weld bead, also will be incorrect. If the determined end points of the seam lie too far in the actual seam or on the sheet next to the seam, all calculations of the geometric data will be incorrect. These points must therefore be determined as accurately as possible in order to obtain reliable monitoring and inspection results. In addition, absolute measured values can only be calculated if the workpiece location to the sensor is known. In particular, the detection of small defects in the seam is difficult if only the weld bead alone is assessed according to the light-section method due to a triangulation line in the trailer.

In order to make a robust quality statement regarding the weld seam, so as to guarantee a high detection rate for small defects with few pseudo errors, the measurement of the weld bead alone is not enough, since e.g., a small offset of the detected weld bead to the actual joining position can already result in a poor connection.

Based on this, the object of the invention is to provide a method and a device for monitoring a joining seam, in particular when joining by means of laser radiation, in which the edges of the joining seam or weld bead are reliably detected, so that the quality of the joining seam can be reliably assessed.

This object is achieved by the method according to claim 1 and the device according to claim 9. Advantageous developments and embodiments of the invention are described in the respective subclaims.

According to the invention, therefore, in a method for monitoring a joining seam in the processing direction before a processing point, a joint or joint line is measured in order to detect its position and geometry, then at least one position of a joining seam is determined from the position of the joint, and behind the processing point in the processing direction, the joining seam is measured to detect its geometry at the determined position.

Here is thus determined from a position in the leader, which detects the location of a joint along a joining path and laterally thereto, the position of a joined location not only along the joining path, but also laterally determined thereto. It is thus known how and where the joined position, thus the joining seam, lies laterally or transversely to the joining path, i.e., transversely to the longitudinal direction of the seam. It is therefore not attempted as in the prior art to determine the geometry of the joining seam, thus the weld bead, from the light-section, which is recorded in the trailer, thus from the geometry of the light-section itself the location of the joining seam, but it is vice versa, the lateral location of the joining seam at least from the position determined in the leader to then determine from the course of the light-section in the region that corresponds to the joint before processing, In this way, it is ensured that the geometry of the weld bead can be reliably detected even in a weld bead geometry, in which the location of the weld bead from the light-section profile is difficult to determine, since the lateral location of the weld bead relative to the seam longitudinal direction from the lateral position of the joint detected in the leader is determined. In particular, it is thus possible to reliably determine the edge of the weld bead even for a weld bead geometry in which the sheet-metal surface passes over flat into the weld bead. Thus, even with difficult to see dimensions of the joining seam or joining bead, reliable detection of the geometry of the joining seam can be obtained, which is essential for a reliable assessment of the welding or soldering quality.

In an advantageous embodiment of the invention, it is provided that the position of the processing point is detected, and that the position of the joining seam is determined from the position of both the joint and the position of the processing point. As a result, the accuracy of the position determination is further improved.

In an advantageous development of the invention, it is provided that a width of the joining seam is determined from a width of a keyhole or molten bath generated by laser radiation in the laser focus, wherein the determination of the width of the joining seam is performed from the width of the keyhole or molten bath generated by laser radiation in the laser focus, taking into account material, speed and/or power dependent parameters. In the case of a working laser beam oscillating rapidly transversely to the joint line, the width of the joining seam is determined taking into account the amplitude of the laser beam oscillation. As an alternative to measuring the keyholes in the image, theoretical values can be assumed by assuming the keyhole at the leading position and assuming the size via the imaging optics.

In particular, the joining seam known from the position and seam width is measured in order to determine the geometry of the joining seam for quality monitoring. As a result, the region of the workpiece surface to be examined for a reliable quality evaluation can be restricted even more precisely to the actual joining seam.

In a practical embodiment of the invention, it is provided that for measuring the joint line and the joining seam, each light-section line is projected transversely across the joint line or joining seam and that the images of the light-section lines are evaluated by means of image processing to detect the position and geometry of the joint line in front of the processing location and to detect the position, width and geometry of the joining seam behind the processing location.

In particular, the seam height, seam width, seam area, bead lengths, concavity, convexity of the weld bead and/or dropouts, non-welded holes and/or edge notches are measured to determine the geometry of the joining seam.

The method according to the invention can advantageously be performed with a device for monitoring a joining seam, which device has the following: a first light-section device for generating a light-section line which lies transversely across a joint line in the processing direction before a processing point, a second light-section device for generating a light-section line which lies transversely across a joining seam behind the processing point, a camera that records images of the two light-section lines and the processing point, and an image processing device that detects the geometry of the joining seam as described above for monitoring the joining seam.

For monitoring a laser joining process, a laser processing head having focusing optics for focusing a working laser beam onto a workpiece to be welded or soldered is further provided with a first and a second light-section device for respectively projecting a light-section line onto a joint line or joining seam in the leader or trailer of a processing point, and provided with a camera, which records images of the two light-section lines and the processing point on the workpiece surface and outputs these to an image processing device that detects the geometry of the joining seam as described above for monitoring the joining seam.

The camera expediently observes the workpiece surface through the focusing optics in the working laser beam path.

Figure 2A:
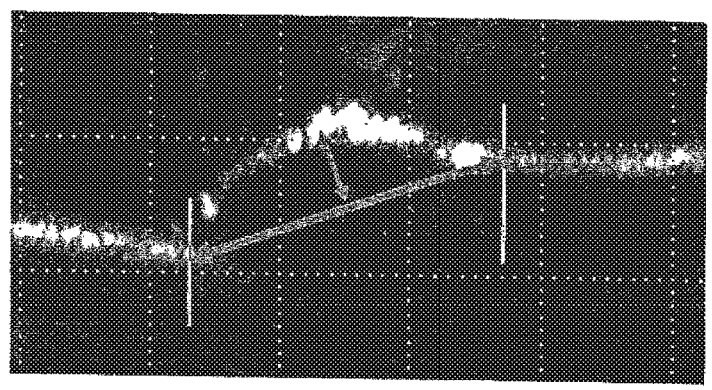
Figure 3A:
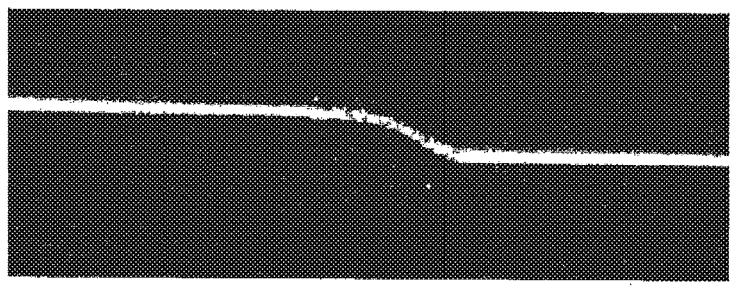
Figure 3A:
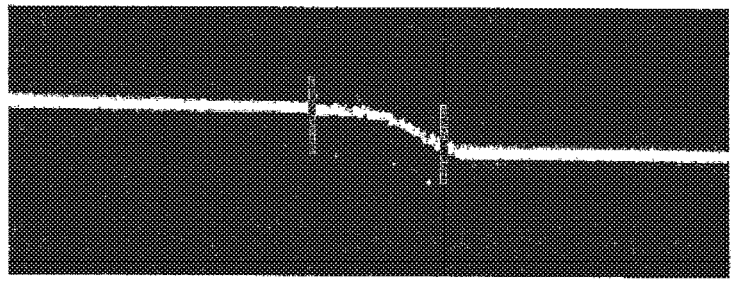
Figure 3A:
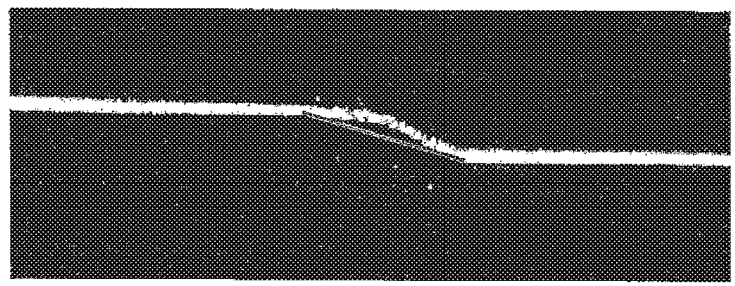
Figure 2B:
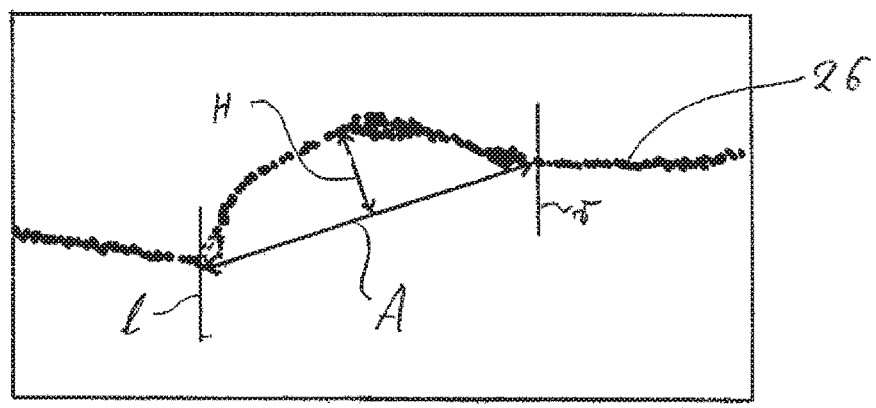
Figure 3B:
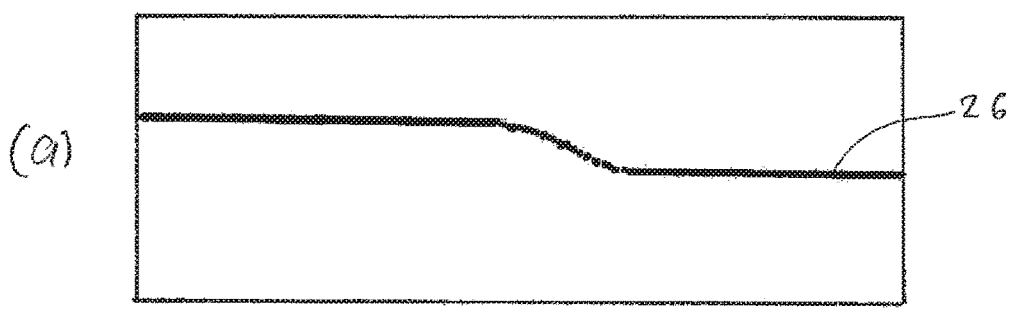
Figure 3B:
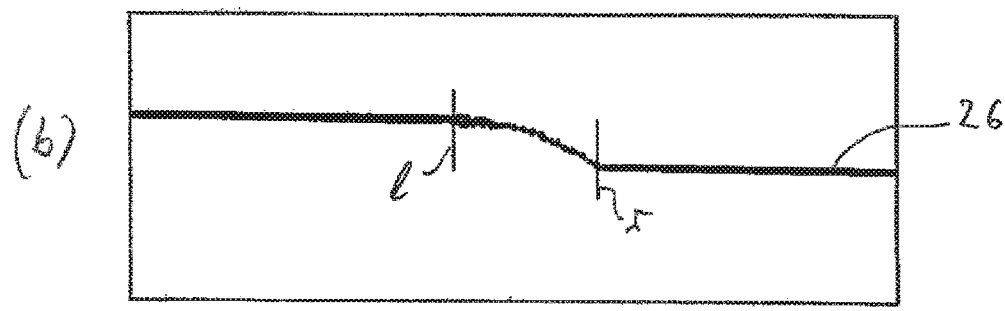
Figure 3B:
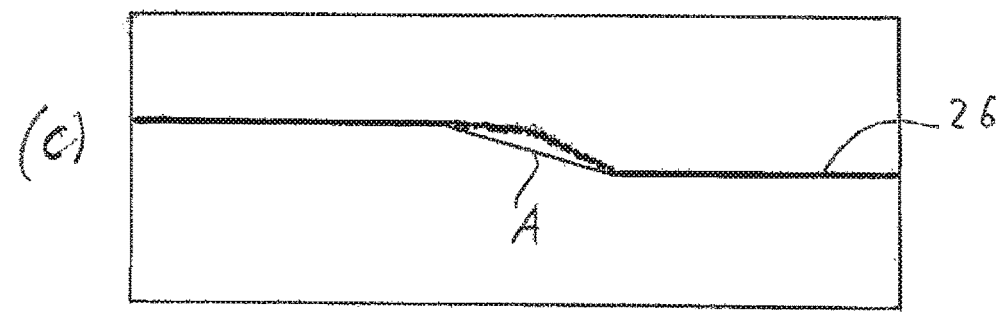
Figure 4A:
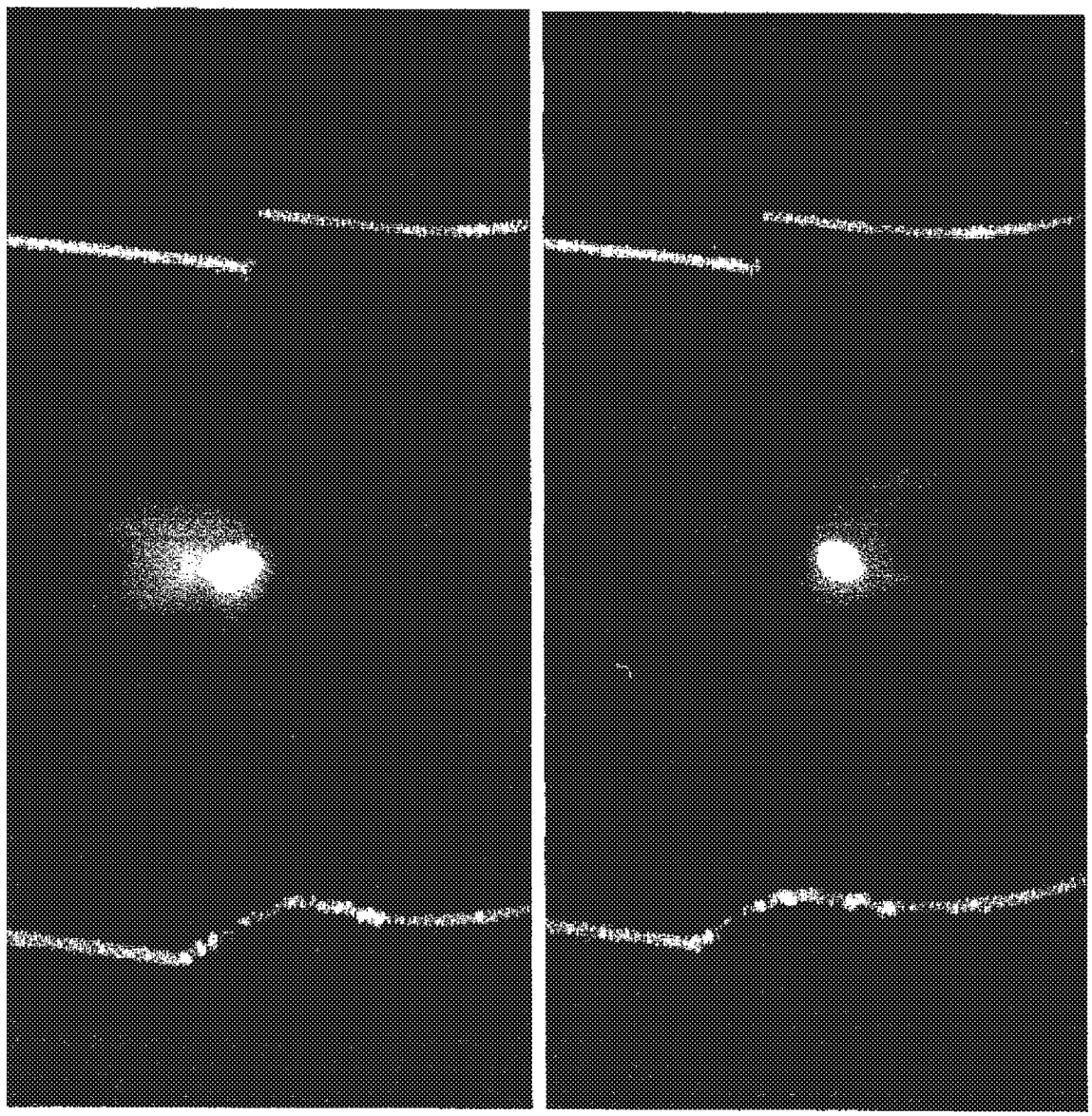
Figure 4B:
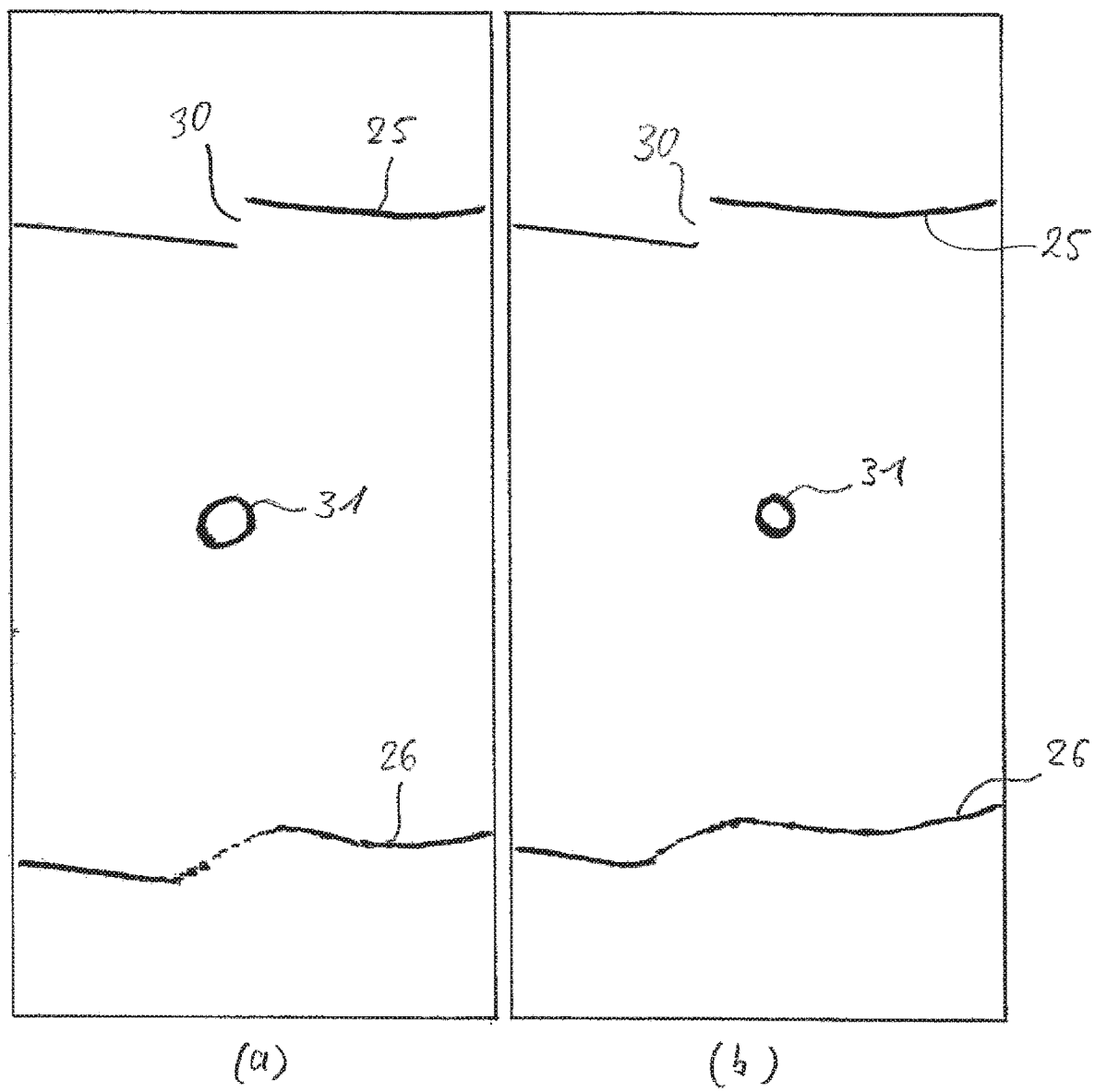
Figure 5A:
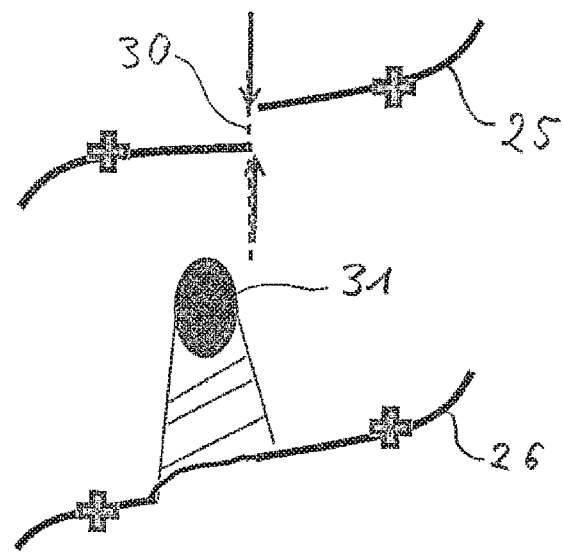
Figure 5B:
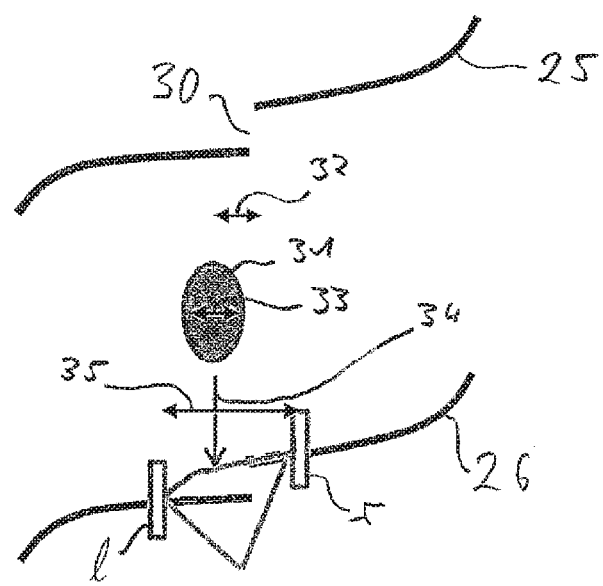
Figure 6A:
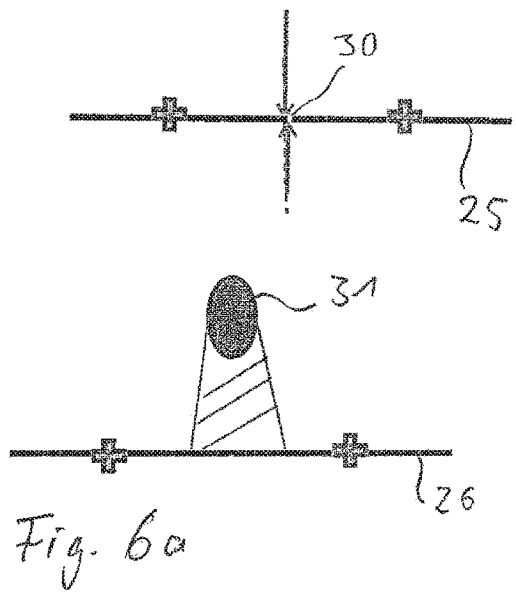
Figure 6B:
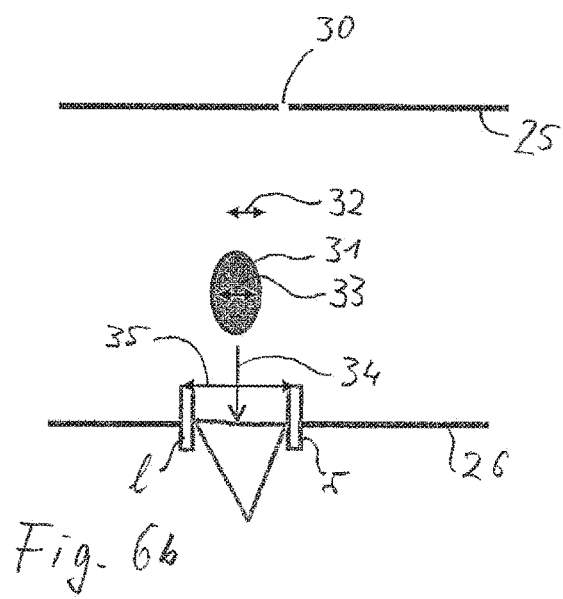
Figure 6C:
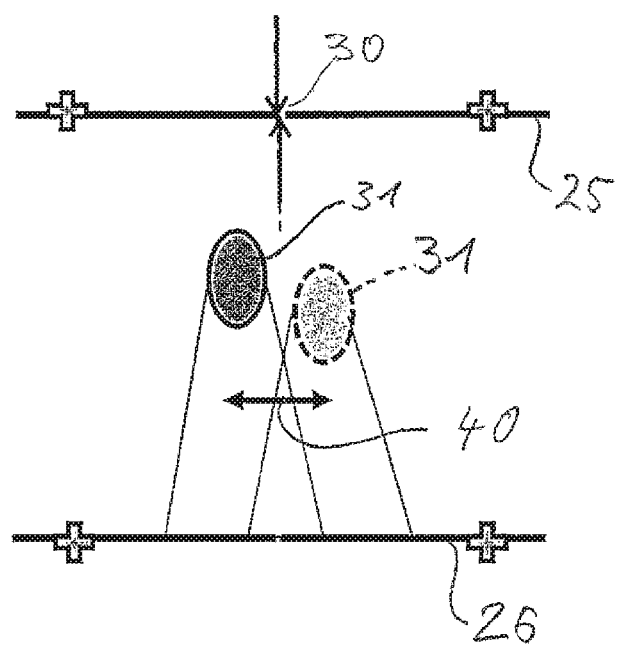

The invention is explained in more detail below, for example, with reference to the drawing. It shows:

FIG. 1 a simplified schematic representation of a laser processing head with a device according to the invention for monitoring a joining seam, FIG. 2A a screenshot of a recording of a light-section line (light-section) projected onto a joining seam (weld bead), FIG. 2B a schematic representation of the light-section line according to FIG. 2A, FIG. 3A a light-section of a joining seam (weld bead) with a flat, difficult to detect transition between the workpiece surface and seam, FIG. 3B a schematic representation of the light-section line according to FIG. 3A, FIG. 4A a screenshot of a recording of the light-section lines in the leader and trailer and of a keyhole or molten bath in the laser processing area, FIG. 4B a schematic representation of the light-sections and of the keyhole or molten bath according to FIG. 4a, FIG. 5a a schematic representation of the light-sections in the leader and trailer and of the keyhole or molten bath on the workpiece during welding of a fillet weld, to illustrate the detection of the geometric data in the leader and trailer and the position of the keyhole or molten bath, FIG. 5b a schematic representation of the light-sections and the keyhole according to FIG. 5a, for illustrating the detection of the seam geometry, FIG. 6a a schematic representation of the light-sections in the leader and trailer and of the keyhole or molten bath on the workpiece during welding of a butt joint, to illustrate the detection of the geometric data in the leader and trailer and the position of the keyhole or molten bath, FIG. 6b a schematic representation of the light-sections and the keyhole according to FIG. 6a, for illustrating the detection of the seam geometry, FIG. 6c a schematic representation of the light-sections and the keyholes according to FIG. 6a, for illustrating the detection of the position of the keyhole or molten bath with an oscillating working laser beam.

In the various figures of the drawing, components and elements corresponding to each other are provided with the same reference numerals.

As shown in FIG. 1, a laser processing head 10 has a housing 11 through which a processing laser beam 12 is led, which is focused by a focusing lens 14 on a workpiece 15.

The focal point or focus 16 in this case lies on the workpiece surface or at a certain distance close above or below, depending on the requirements of the desired weld and melts the workpiece material for welding two sheets or the like. In this case, a vapor capillary is commonly configured in the region of the laser focus 16, that is, the so-called tool center point (TCP), which is also referred to as a keyhole and which lies in the center of the processing area. A camera 18 is provided for observing the keyholes or molten bath, which camera receives process radiation, back reflections and other light reflected at the workpiece surface via the focusing lens 14, a partially transmissive mirror 19 arranged in the working beam path and a camera objective 20 for observing the workpiece surface. The partially transmissive mirror 19 is substantially transparent to the working laser radiation, while it is reflective to other wavelength ranges.

In order to be able to detect the surface geometry of the workpiece, the position of the joint line in the leader, i.e., in the processing direction before the TCP, and the position and geometry of the joining seam or weld bead in the trailer, i.e., in the processing direction behind the TCP, a first and a second light-section device 21, 22 is provided, the respective laser light source 23, 24 of which projects a laser light line, which is referred to below as a light-section line 25, 26 or simply as a light-section. In order to generate the light-section lines 25, 26 in the leader or trailer, the laser light sources 23, 24 emit a laser beam 27, 28, which is configured fan-shaped either in a manner not shown, or which scans the surface of the workpiece transversely to the joint line or joining seam at high speed.

The images recorded by the camera 18 are delivered to an image processing device 30 which, from the light-section line 25 in the leader, measures the location or position of the joint line, an edge offset and a crack between the workpieces to be welded, for example, between two sheets. The shape and position of the joining seam or weld bead are detected from the light-section line 26 in the trailer. In particular, the seam height, the seam width, the seam area, the length of the weld bead surface in the transverse direction of the seam, the concavity or convexity of the seam are detected to thereby also identify dropouts and holes in the seam and edge notches.

To determine the location or position of the keyhole or TCPs, the working laser radiation and/or process light reflected back from the region of interaction between working laser beam 12 and workpiece 15 is recorded by the camera 18.

An image as seen by the camera is shown in FIG. 4A. The position of the joint line in the leader is used to track the laser focus 16 on the joint line when the laser focus 16 reaches the point of the joint line whose position is to be used for tracking. Here, the distance of the light-section line 25 in front of the laser focus 16 to the laser focus 16 and the feed rate at which the laser processing head 10 is guided along the joint line is to be taken into account. The feed rate is preferably read from a machine control, not shown, which controls the movement of the laser processing head 10.

It is also possible to deduce the distance between the laser processing head 10 and workpiece 15 from the distances between the light-section lines 25, 26 and the laser focus 16, since the distances between the light-section lines 25, 26 and the laser focus 16 increase when the laser processing head 10 approaches the workpiece 15, while the distances decrease when the laser processing head 10 moves away from the workpiece 15. The workpiece surface shape and possibly also a tilting of the laser processing head 10 with respect to a perpendicular to the workpiece surface can be detected from the angles of the light-section lines to one another and from their general shape.

FIGS. 2A and 2B show an example of a light-section line 26 that is projected on a convex weld bead.

The arc-shaped region of the light-section line 26 represents the surface of the weld bead, the edges of which are marked by the vertical lines 1 and r. The distance A between the points of intersection of the lines 1 and r with the light line 26, i.e., the Euclidean distance between the left and right edge point, represents the width of the seam, while the seam height H of the weld bead is given by the distance between the connecting line A and the arc-shaped region of the light-section line 26. The length of the weld bead is given by the length of the light line 26 between the marking lines 1, r.

FIGS. 3A and 3B show an example of a light-section line 26 in the trailer, in which the surface of the left workpiece passes over flat into the seam area, so that the left edge of the weld bead is difficult to detect. In FIGS. 3A (b), (c), and 3B (b), (c), the edges of the weld bead are marked by the lines 1, r, or the width of the seam is illustrated by the distance A.

FIG. 4A (a) and (b) shows a screenshot of the camera image, thus the image that the camera 18 records of the workpiece surface. The upper light-section line 25 represents the light-section in the leader, wherein the edge offset and the crack between the workpieces can be seen as a gap 30. The position of the joint line in the leader is determined from this gap 30. In the middle of the image, the region of interaction between the working laser beam 12 and the workpiece 15, in particular the keyhole or the molten bath generated by the working laser beam, can be seen as a spot 31. The position of the TCP can be determined from the location of the spot 31, which corresponds to the center of the spot 31, that is, the center of the keyhole or the molten bath.

The lower light-section line 26 represents the light-section in the trailer, from which the individual parameters of the weld bead are determined, which are required to determine the quality of the weld.

In FIG. 4A (a) and B (a), the spot 31, which represents an image of the keyhole or the molten bath, is deflected leftward, while in FIG. 4A, B (b), the keyhole or the molten bath is deflected to the right.

The keyhole also oscillates quickly transversely the joint in a laser processing head, in particular welding head with fast oscillating laser beam. In addition to the width of the spot, the amplitude of the oscillation enters into the seam width, as is explained in more detail below with reference to FIG. 6c.

Thus, FIG. 4 shows images of three regions of the workpiece surface recorded at the same time.

In order to use the location of the joint line in the leader that is represented by the gap 30 in the light-section line 25 for tracking the laser focus 16, one should take into account the time required by the TCP to get from its position shown in the middle of FIG. 4, which corresponds to the location of the spot 31, to the respectively measured position of the joint line in the leader. If the position of the joint line in the leader and/or the position of the tool center point or laser focus 16, which is determined from the spot 31, is used for the determination of the seam center position, i.e., the location of the seam center transverse to the longitudinal direction of the joint line and/or the seam width, as is explained in greater detail below, it is also necessary to take into account the time required for the light-section line 26 to reach the position in which the position of the keyhole from the spot 31 was determined. The time delay results from the distance between the tool center point and the light-section and the respective feed rate, which can be constant or variable.

As shown in FIG. 5A, the joining position, i.e., the location or position of the joint line, the crack between the workpieces and the edge offset from the position and geometry of the gap 30 are determined from the geometry of the light-section line 25 in the leader. In addition, 3D points of the workpiece surface are detected, which are indicated in the drawing as crosses. The location and size of the keyhole or molten bath is determined from the spot 31. Finally, the geometry of the workpiece surface and in particular the geometry of the weld bead in the trailer is in turn determined from the light-section line 26. Furthermore, 3D points of the sheet metal or workpiece geometry in the space are detected, which are also indicated as crosses.

As shown in FIG. 5B, the location of the weld bead transverse to the joint line, as indicated by the arrow 34, results from the joining position, which is determined from the location of the gap 30, and the offset between the joining position and the position of the subsequently recorded spot 31. The width of the weld bead, which is indicated by the arrow 35, resulting from the width of the spot 31, which is indicated by the double arrow 33, and another factor, which depends on the feed rate, the material of the workpieces, the power of the working laser beam and the geometry of the workpiece surface in the leader.

From the lateral location of the weld bead and from its width, which was determined from the position of the joint measured in the leader and/or the location and size of the spot, then the region results in the recorded light-section line 26, which should be examined for the quality control of the weld in order to detect the seam geometry and dropouts, holes and edge notches.

While FIGS. 5A and 5B illustrate the situation with fillet welds, FIGS. 6A and 6B show the corresponding elements in the welding of a butt splice, i.e., in the welding of a seam in which the two workpieces or sheets with their edges stand directly opposite each other without offset.

The seam width and the seam position are determined in a butt splice welding in the same manner as was described with reference to FIGS. 5A and 5B for the welding of a fillet weld.

If a working laser beam which oscillates quickly transverse to the joint line is used for welding, the keyhole also oscillates quickly transverse to the joint. As indicated in FIG. 6c for the situation with butt joint welding with oscillating working laser beam, the position of the spot 31, i.e., the position of the keyhole or molten bath, varies according to the amplitude of the laser beam deflection. The corresponding deflection of the spot 31 is illustrated in FIG. 6c by the double arrow 40. In the seam width, in addition, the amplitude of the oscillation enters into the width of the spot 31.

The determination of the position (seam center position) and the width of the joining seam from the position of the joint line in the leader, the offset between the position of the joint line in the leader and the keyhole, i.e., the spot 31, and from the position of the keyhole and the keyhole or spot width is particularly important, since in the ideal case, the light-section line 26 in the trailer has no interruption or deviation, since the joining seam then has a surface that is ideally aligned with two workpieces to be welded. By checking the region of the light line 26 in the trailer, which was determined by the measurements in the leader and processing region, a reliable quality monitoring can be achieved even with a butt splice welding.

In addition to the position of the weld bead from leader, offset and keyhole position, the offset of the weld bead to the joining position, i.e., the TCP, it is also possible to determine the tilt angle over the location of the workpiece in space from the 3D data from the leader and trailer and the position of the laser processing head.

According to the invention, the exact determination of weld bead end point is made possible in the image search region of the light-section line in the trailer, which are determined via the leader and spot (TCP). This results in the reliable determination of the absolute geometry data (under curvature, width, concavity, etc.) of the seam. Furthermore, it is also possible to use the brightness of the light-section line above the weld bead to examine surface defects. Finally, the laser power can also be measured and used for correlation with the brightness and geometry data in order to obtain a robust quality statement by correlation of all the data described above.

The correlation of joining position, sheet metal or workpiece geometry, geometry and surface data of weld bead and laser power data thus results in a total and reliable quality monitoring of the joining process.

The invention claimed is:

1. A method for monitoring a joining seam by laser radiation, comprising:
    measuring a joint in front of a processing point in a processing direction in order to detect a position of the processing point along a joining path and lateral to the joining path, and geometry of the processing point,
    determining a lateral position of a joining seam from behind the processing point, and
    measuring the joining seam from behind the processing point, at the determined lateral position to detect geometry of the joining seam.

2. The method according to claim 1, further comprising determining the position of the joining seam from the position of the joint and the position of the processing point.

3. The method according to claim 1, further comprising determining a width of the joining seam from a width of a keyhole or molten bath generated by the laser radiation.

4. The method according to claim 3, wherein the determination of the width of the joining seam takes into account material, speed or power dependent parameters.

5. The method according to claim 3, wherein the determination of the width of the joining seam takes into account an amplitude of oscillation of a working laser beam transversely to the joint seam.

6. The method according to claim 3, further comprising determining quality based on a position and the geometry of the joining seam.

7. The method according to claim 6, wherein determining the geometry of the joining seam comprises determining a seam height, a seam width, a seam area, bead lengths, concavity, convexity of weld bead or dropouts, non-welded holes or edge notches.

8. The method according to claim 1, wherein a light-section line is projected transversely across the joining seam and images of the light-section lines are evaluated by image processing to determine the lateral position and geometry of the joining seam before the processing point, and a width and geometry of the joining seam after the processing point.

9. A device for monitoring a joining seam, in particular during joining by means of laser radiation, comprising:
    a first laser configured to project a first light-section line onto a workpiece at a location in front of a processing point, the first-section line traversing across a joint line,
    a second laser configured to project a second light-section line onto the workpiece at another location behind the processing point, the second-section line traversing across a joining seam,
    a camera that captures images of the two light-section lines and the processing point, and
    an image processing device configured to:
        detect a position of the processing point along a joining path and lateral to the joining path and geometry of the processing point from the first light-section line,
        determine a lateral position of a joining seam from the second light-section line, and
        measure the joining seam at the determined lateral position to detect geometry of the joining seam.

10. A laser processing head comprising:
    a first laser configured to project a first light-section line onto a workpiece at a location in front of a processing point, the first-section line traversing across a joint line,
    a second laser configured to project a second light-section line onto the workpiece at another location behind the processing point, the second-section line traversing across a joining seam,
    a camera that captures images of the two light-section lines and the processing point, and
    an image processing device configured to:
        detect a position of the processing point along a joining path and lateral to the joining path and geometry of the processing point from the first light-section line,
        determine a lateral position of a joining seam from the second light-section line, and
        measure the joining seam at the determined lateral position to detect geometry of the joining seam.

11. The laser processing head of claim 10, wherein the camera captures the workpiece through focusing optics in a path of a working laser beam.

* * * * *